United States Patent [19]

Kirschbaum

[11] Patent Number: 4,465,962

[45] Date of Patent: Aug. 14, 1984

[54] PERMANENT SPLIT CAPACITOR SINGLE PHASE ELECTRIC MOTOR SYSTEM

[75] Inventor: Herbert S. Kirschbaum, Asheville, N.C.

[73] Assignee: Westinghouse Electric Corp., Pittsburgh, Pa.

[21] Appl. No.: 479,776

[22] Filed: Mar. 28, 1983

[51] Int. Cl.³ .............................................. H02P 5/28
[52] U.S. Cl. .................................... 318/817; 318/813
[58] Field of Search ............................ 318/812–817, 318/794, 795

[56] References Cited

U.S. PATENT DOCUMENTS

| | | | |
|---|---|---|---|
| 1,944,090 | 1/1934 | Lukens | 318/795 |
| 2,034,950 | 3/1936 | Lyden | 318/795 |
| 3,675,100 | 7/1972 | McNamara et al. | 318/814 |

Primary Examiner—David Smith, Jr.
Attorney, Agent, or Firm—R. P. Lenart

[57] ABSTRACT

A permanent split capacitor single phase electric motor achieves balanced operation at more than one operating point by adjusting the voltage supplied to the main and auxiliary windings and adjusting the capacitance in the auxiliary winding circuit. An intermediate voltage tap on an autotransformer supplies voltage to the main winding for low speed operation while a capacitive voltage divider is used to adjust the voltage supplied to the auxiliary winding for low speed operation.

7 Claims, 4 Drawing Figures

PERMANENT SPLIT CAPACITOR SINGLE PHASE ELECTRIC MOTOR SYSTEM

STATEMENT OF GOVENMENT INTEREST

The United States Government has rights in this invention pursuant to Prime Contract No. W-7405-ENG-26 and Subcontract No. 86X-24712-C awarded by the United States Department of Energy.

BACKGROUND OF THE INVENTION

This invention relates generally to dynamoelectric machines and more particularly to permanent split capacitor single phase electric motor systems which are capable of balanced operation at more than one load point.

Permanent split capacitor single phase motors are known to be useful in fan drive systems. Recent designs of high performance heat pumps have evolved toward heat pumps that have a dual capacity compressor system. Such a system would typically have a 2:1 capacity ratio. With this ratio, comfort conditions would require that the low capacity indoor air flow be approximately one-half to two-thirds of the high capacity air flow. Current high efficiency single phase permanent split capacitor motors when designed to operate with a deep reduction in speed using a booster winding in series with the main winding, suffer from very serious loss in motor efficiency at low speed. This is especially significant since in a heat pump application, the blower motor may operate as many as 6,500 hours per year with perhaps 4,000 of those hours in the low speed mode. Although some relief in lifetime inefficiency can be obtained by using a somewhat higher rotor resistance than would be used with a normal high efficiency motor, low speed efficiency can be further improved by operating the motor as a balanced motor at the low speed design point without sacrificing the ability to operate it as a balanced motor at the high speed operating point.

It is understood in the art that permanent split capacitor single phase motors operate very efficiently in the balanced operation mode. For example, P. H. Trickey, in "Design of Capacitor Motors for Balanced Operation", Transactions AIEE, 1932, pages 780 to 785, described a theoretical method of obtaining balanced operating conditions for single phase powered capacitor motors. The design of a permanent split capacitor single phase motor is discussed in detail in U.S. Pat. No. 4,100,444, issued July 11, 1978 to Boyd.

Permanent split capacitor motors are generally made to operate at reduced speed by adding in series with the main winding a so-called booster winding which, in conjunction with the main winding, reduces the air gap flux significantly. Current design methodology permits the design of a motor at one operating point for balanced operation. Under balanced conditions, the magnetomotive forces of the main and auxiliary windings are equal in magnitude and displaced in time by 90°. This condition leads to only a forward rotating field in the air gap of the machine. The absence of a backward rotating field greatly improves the motor efficiency at this operating point. If a two-speed motor is required to perform a deep speed reduction such as required in a heat pump application, after having been designed for balanced operation at the high speed, its slow speed operation would be very badly unbalanced if conventional booster winding technology is used. Improvement in low speed efficiency can be effected by operating the main winding and auxiliary circuit at different voltages which are selected to result in balanced operation at the low speed.

SUMMARY OF THE INVENTION

A permanent split capacitor single phase electric motor system which is capable of balanced operation at more than one load point in accordance with this invention comprises: a pair of line terminals for connection to an alternating current power source; means connected to the line terminals for producing an intermediate voltage; a first stator winding; means for connecting the first stator winding to the power source for operation at one speed; means for connecting the first stator winding to the intermediate voltage for operation at a second speed; means connected to the line terminals for producing a second intermediate voltage; a capacitor connected in series with a second stator winding to form a branch circuit which is connected to the power source for operation at the first speed; and means for connecting the second stator winding to the second intermediate voltage for operation at the second speed. One of the intermediate voltages can be produced by an autotransformer which is connected across the line terminals of the motor system. A capacitive voltage divider comprising the series connection of two capacitors, can be connected across the line terminals to produce the second intermediate voltage.

DESCRIPTION OF THE PREFERRED EMBODIMENTS

Figure 1:
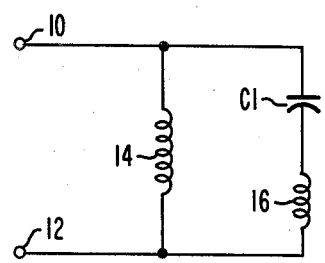
FIG. 1 is a schematic diagram of a prior art permanent split capacitor single phase motor stator circuit.
Figure 2:
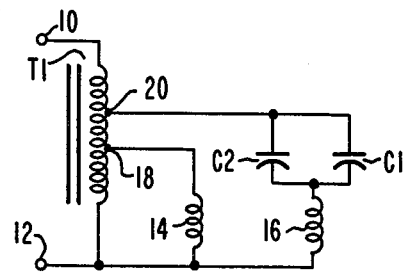
FIG. 2 is a schematic diagram of a permanent split capacitor motor system utilizing an autotransformer to achieve balanced operation at a low speed operating point in accordance with one embodiment of the present invention.

Referring to the drawings, FIG. 1 is a schematic diagram of a prior art permanent split capacitor single phase electric motor stator circuit. A pair of line terminals 10 and 12 are provided for connection to an external alternating current power source. A first or main stator winding 14 is connected between line terminals 10 and 12 and capacitor C1 is connected in series with a second or auxiliary stator winding 16 to form a circuit branch which is also connected between terminals 10 and 12. The parameters of the circuit of FIG. 1 can be adjusted for balanced operation in accordance with the method described in the cited P. H. Trickey reference. For example, the motor illustrated in FIG. 1 may be a 230 volt AC, ⅜ horsepower, four-pole motor having a medium resistance rotor. This motor would have no booster winding, with maximum slot fullness being used for the main and auxiliary windings. With a capacitor C1 equal to 9.75 microfarad in series with the auxiliary winding, the motor operates as a balanced permanent split capacitor motor at 1618 rpm into a blower shaft load of 0.375 horsepower. To operate this motor at ⅔ speed under balanced conditions in accordance with one embodiment of this invention, the circuit of FIG. 2 can be used. In this embodiment, autotransformer T1 is connected across line terminals 10 and 12 and is provided with intermediate voltage taps 18 and 20. The main winding 14 of this example operates off a 39.2% tap 18 of autotransformer T1 and the auxiliary winding 16 operates off a 73.0% tap 20 of the same autotransformer. Capacitor C2 is added in parallel with capacitor C1 to achieve a total capacitance of 15.98 microfarads in series with auxiliary winding 16. Under these conditions of operation, the motor operates as a balanced permanent split capacitor single phase motor at 1078.7 rpm (⅔ of 1618 rpm) into a blower load of 0.111 shaft horsepower. The total burden on autotransformer T1 in the low speed connection is 170.5 volt amps. It is desirable to reduce this burden so as to reduce the cost of the autotransformer.

A reduction in the autotransformer burden can be achieved if auxiliary winding 16 is excited directly from the line power source. A capacitive voltage divider can be used for this purpose with the capacitor values being determined through the use of Thevenin's Theorem. Thevenin's Theorem can be stated in two parts: a. Any terminal pair of a network composed of active sources and linear passive elements can be represented relative to these terminals by an ideal voltage source $E_{OC}$ in series with an impedance $Z_D$; b. The voltage source $E_{OC}$ is the open circuit potential difference which would be measured between the terminal pair mentioned above, and the impedance $Z_D$ is the impedance measured looking into the pair of terminals in question, with all ideal sources inside the network set to zero. This is equivalent to replacing all non-ideal sources with their internal impedances. This impedance is called the driving point impedance at the terminal pair in question. Using this theorem, the 167.906 volts at voltage tap 20 and the 15.98 microfarads represented by capacitors C1 and C2 of FIG. 2 can be viewed respectively as the open circuit voltage $E_{OC}$ and the driving point impedance $Z_D$ of a capacitor network excited directly from the 230 volt line which is connected to terminals 10 and 12.

Figure 3:
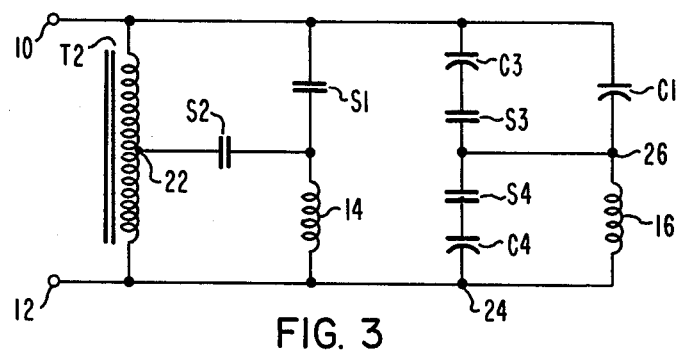
FIG. 3 is a schematic diagram of a permanent split capacitor motor system which utilizes the combination of an autotransformer and a capacitor voltage divider to achieve balanced operation at two operating speeds in accordance with one embodiment of the present invention.

FIG. 3 is a schematic of a permanent split capacitor motor system which utilizes a capacitor voltage divider to adjust the auxiliary winding voltage for balanced operation at low speed in accordance with one embodiment of this invention. Autotransformer T2 is connected across line terminals 10 and 12 and includes an intermediate tap point 22. It acts as a means for providing an intermediate voltage to main winding 14 during low speed operation. A capacitor voltage divider comprising the series connection of capacitors C3 and C4 is connected across terminals 10 and 12 and acts as a means for providing a second intermediate voltage which appears across auxiliary winding 16 during low speed operation. For high speed operation, switch S1 is closed while switches S2, S3 and S4 are open. For low speed operation, switch S1 is open while switches S2, S3 and S4 are closed. For the motor example given, C1 equals 9.75 microfarads for high speed balanced operation. To calculate the values of capacitors C3 and C4, Thevenin's Theorem requires that the voltage between points 24 and 26 with auxiliary winding 16 removed be equal to 167.906 volts. This is $E_{OC}$. It will be apparent to those skilled in the art that with auxiliary winding 16 removed, $$E_{OC} = \frac{C_3 + 9.75}{(C_3 + C_4 + 9.75)} \times 230 \text{ volts} \quad (1)$$

for this Example. The driving point impedance looking into terminals 24 and 26 would be equal to the impedance of the parallel connection of capacitors C1, C3 and C4, with the internal impedance of the 230 volt source equal to 0 and the source voltage itself equal to 0. Since the auxiliary winding is excited in series with a 15.98 microfarad capacitor for balanced low speed operation, C1+C3+C4 must equal 15.98 microfarads. Since $E_{OC}$ is 167.906 volts, C1+C3 must be 11.666 microfarad from Equation 1. Capacitor C4 would then be 4.314 microfarad. Since capacitor C1 is 9.75 microfarad for balanced operation at high speed, capacitor C3 must be 1.916 microfarad. The precision of the calculation of voltages and capacitors used in this example does not imply extreme sensitivity of this concept to the exact value of the capacitances chosen. The practical values of capacitors C1, C3 and C4 would be 10, 2 and 4 microfarads, respectively. Using the circuit of FIG. 3, the total volt ampere rating of autotransformer T2 is 131 volt amps, which is about ¾ of the autotransformer rating required in the circuit of FIG. 2.

Figure 4:
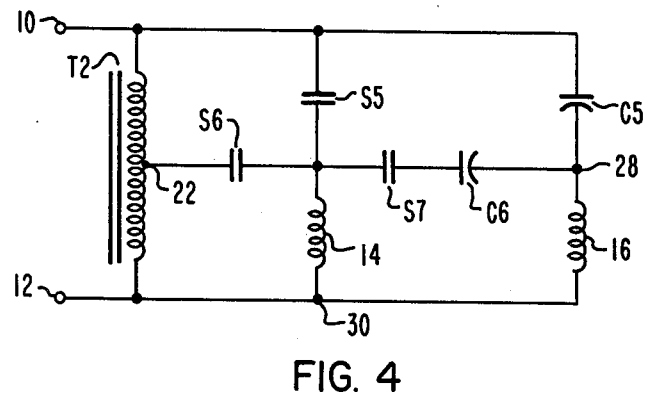
FIG. 4 is a schematic diagram of a permanent split capacitor motor system constructed in accordance with an alternative embodiment of the present invention.

FIG. 4 is a schematic diagram of a permanent split capacitor motor system constructed in accordance with an alternative embodiment of the present invention. For high speed operation, switch S5 is closed, while switches S6 and S7 are open. This places main winding 14 across line terminals 10 and 12 with secondary winding 16 being connected in series with capacitor C5 to form a branch circuit across line terminals 10 and 12. For low speed operation, switch S5 is open, while switches S6 and S7 are closed. This connects main winding 14 between line terminal 12 and intermediate voltage tap point 22, with capacitor C6 being connected between intermediate voltage tap point 22 and secondary winding 16. It should be understood that the Thevenin equivalent of the circuit of FIG. 4, as viewed between points 28 and 30 and looking into the transformer/capacitor network as a voltage source, is the same as that of FIG. 3. It is intended that this patent cover all such motor systems which have the same Thevenin equivalent across the auxiliary winding when viewed toward the power source.

While the invention has been illustrated by a preferred embodiment, it should be understood that in the broadest aspects of the invention, certain changes may be made, for example, by the addition of parts or by the substitution of equivalents, without departing from the invention. It is therefore intended that the appended claims cover all such changes which may occur within the scope of the invention.

What is claimed is:

1. An alternating current electric motor system comprising:
   a pair of line terminals for connection to an alternating current power source having a first voltage;
   an autotransformer connected to said line terminals for producing a second voltage on a first intermediate voltage terminal;
   a first stator winding;

means for connecting said first stator winding between said line terminals for operation at a first speed;

means for connecting said first stator winding between one of said line terminals and said first intermediate voltage terminal for operation at a second speed;

a capacitive voltage divider connected to said line terminals for producing a third voltage on a second intermediate voltage terminal, with said second intermediate voltage terminal being a connection within said capacitive voltage divider;

a first capacitor;

a second stator winding being connected in series with said first capacitor to form a circuit branch which is connected to said line terminals;

means for connecting said second stator winding between one of said line terminals and said second intermediate voltage terminal for operation at said second speed; and wherein said capacitive voltage divider includes a second and a third capacitor connected in series with said second intermediate voltage terminal being the connection between said second and third capacitors.

2. An alternating current electric motor system as recited in claim 1, wherein said first, second and third voltage levels are adjusted to achieve substantially balanced motor operation at both said first and said second speeds.

3. An alternating current electric motor system comprising:

a pair of line terminals for connection to an alternating current power source having a first voltage;

means connected to said line terminals for producing a second voltage on a first intermediate voltage terminal;

a first stator winding;

means for connecting said first stator winding between said line terminals for operation at a first speed;

means for connecting said first stator winding between one of said line terminals and said first intermediate voltage terminal for operation at a second speed;

means connected to said line terminals for producing a third voltage on a second intermediate voltage terminal;

a first capacitor;

a second stator winding being connected in series with said first capacitor to form a circuit branch which is connected to said line terminals;

means for connecting said second stator winding between one of said line terminals and said second intermediate voltage terminal for operation at said second speed;

a second capacitor which is connected in parallel with said first capacitor for operation at said second speed; and wherein said means for producing a second voltage and said means for producing a third voltage together comprise a single autotransformer with said first and second intermediate voltage terminals being tap points on said autotransformer.

4. An alternating current electric motor system as recited in claim 3, wherein said first, second and third voltage levels are adjusted to achieve substantially balanced motor operation at both said first and said second speeds.

5. An alternating current electric motor system comprising:

a pair of line terminals for connection to an alternating current power source having a first voltage;

means connected to said line terminals for producing a second voltage on an intermediate voltage terminal;

a first stator winding;

means for connecting said first stator winding between said line terminals for operation at a first speed;

means for connecting said first stator winding between one of said line terminals and said intermediate voltage terminal for operation at a second speed;

a first capacitor;

a second stator winding being connected in series with said first capacitor to form a circuit branch which is connected to said line terminals;

a second capacitor; and means for connecting said second capacitor between said intermediate voltage terminal and a common connection between said first capacitor and said second stator winding in said circuit branch, for operation at said second speed.

6. An alternating current electric motor system as recited in claim 5, wherein said means for producing a second voltage comprises:

an autotransformer with said first intermediate voltage terminal being a tap point on said autotransformer.

7. An alternating current electric motor system as recited in claim 5, wherein said first and second voltage levels are adjusted to achieve substantially balanced motor operation at both said first and second speeds.

* * * * *